(12) United States Patent
Uke (10) Patent No.: US 11,138,020 B1
(45) Date of Patent: Oct. 5, 2021

(54) CONTENT PROVISIONING SYSTEM (71) Applicant: SAP SE, Walldorf (DE)

(72) Inventor: Sangeeta Uke, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/011,293

(22) Filed: Sep. 3, 2020

(51) Int. Cl.
G06F 9/44 (2018.01)
G06F 9/445 (2018.01)
G06F 8/71 (2018.01)
G06F 11/36 (2006.01)

(52) U.S. Cl.
CPC ............ *G06F 9/44521* (2013.01); *G06F 8/71* (2013.01); *G06F 11/3664* (2013.01)

(58) Field of Classification Search
CPC ............ G06F 9/44521; G06F 9/44526; G06F 11/3664; G06G 8/71
USPC ........................................................ 717/121
See application file for complete search history.

(56) References Cited

U.S. PATENT DOCUMENTS

| 10,229,251 | B1* | 3/2019 | Dalessio | G06F 8/71 |
| 2015/0178074 | A1* | 6/2015 | Kaneko | G06F 8/71 717/122 |
| 2016/0234341 | A1* | 8/2016 | Dare | H04L 67/34 |
| 2017/0046143 | A1* | 2/2017 | Kochhar | G06F 8/60 |
| 2017/0264684 | A1* | 9/2017 | Spillane | H04L 67/1095 |
| 2019/0102411 | A1* | 4/2019 | Hung | H04L 41/0856 |
| 2020/0004660 | A1* | 1/2020 | Falko | G06F 11/3636 |
| 2020/0104102 | A1* | 4/2020 | Brockschmidt | G06N 3/08 |

OTHER PUBLICATIONS

Title: A client profile framework for providing adapted contents in ubiquitous environments, author: KS Kim, published on 2008; source: ACM.*
Title: Next generation mobile cloud gaming, author: W Cai et al, published on 2013, source: IEEE.*

* cited by examiner

*Primary Examiner* — Chameli Das
(74) *Attorney, Agent, or Firm* — Schwegman Lundberg & Woessner, P.A.

(57) ABSTRACT

Techniques for provisioning digital content across different tools of different environments of a private cloud architecture are disclosed. In some embodiments, a method performed by a computer system of a private cloud architecture serving an organization comprises: obtaining a raw library of content from an object store, the object store being external to the private cloud architecture; adapting the obtained raw library of content to the private cloud architecture using one or more rules of the organization, the adapting of the obtained raw library of content generating an adapted library of content by applying one or more constraints on use of the obtained raw library of content within the private cloud architecture; and transmitting the adapted library of content to a development environment of the private cloud architecture, to a testing environment of the private cloud architecture, and to a production environment of the private cloud architecture.

20 Claims, 7 Drawing Sheets

CONTENT PROVISIONING SYSTEM

TECHNICAL FIELD

The present application relates generally to the technical field of electrical computer systems, and, in various embodiments, to systems and methods of provisioning digital content efficiently and reliably across different tools of different environments of a private cloud architecture.

BACKGROUND

Current solutions for making digital content available for use within a private cloud architecture suffer from technical problems. Private cloud architectures may provide enterprise resource planning (ERP) software that includes a system of integrated applications for managing a business and automating many back-office functions related to technology and services. One or more software tools may be employed to enable users to select, adapt, and activate preconfigured best practices content, as well as to enable users to create their own content. However, since the best practices content is obtained by the private cloud architecture from a source that is external to the private cloud architecture, it is not adequately adapted to the particular objectives and requirements of the organization being served by the private cloud architecture.

Currently, the content is delivered via standard open source tools to multiple software tools of different environments within the private cloud architecture, such as to tools of a development environment within the private cloud architecture, to tools of a testing environment within the private cloud architecture, and to tools of a deployment environment within the private cloud architecture. through standard open source tools. However, adapting the content at an open source tool external to the private cloud environment creates a data security risk and increases the workload of the open source tool. Furthermore storing configurations corresponding to the adaptations of the content in a source external to the private cloud environment makes the private cloud environment dependent on its access to the external source, and, therefore for vulnerable to faults and failures of the external source. On the other hand, adapting the content at every tool within every environment within the private cloud architecture also raises technical problems by increasing the workload for every tool and making inconsistency in the content between the different tools of the different environments more likely.

In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems for provisioning digital content efficiently and reliably across different tools of different environments of a private cloud architecture are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to provide a centralized content provisioning system that adapts content received from an object store external to a private cloud architecture serving an organization based on one or more rules of the organization. The centralized content provisioning system then transmits the adapted content to different tools of different environments of the private cloud architecture.

By adapting the content locally within the private cloud architecture instead of externally, data security is increased and the resilience of the private cloud architecture is increased, as the local storage of the adapted content within the private cloud architecture protects against service faults, failures, and outages of an external source. Additionally, the workload associated with adapting the content is minimized and consistency between the adapted content between the different tools of the different environments of the private cloud architecture is maximized by adapting the content at a centralized provisioning system within the private cloud architecture instead of adapting the content separately at each tool within each environment of the private cloud architecture. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
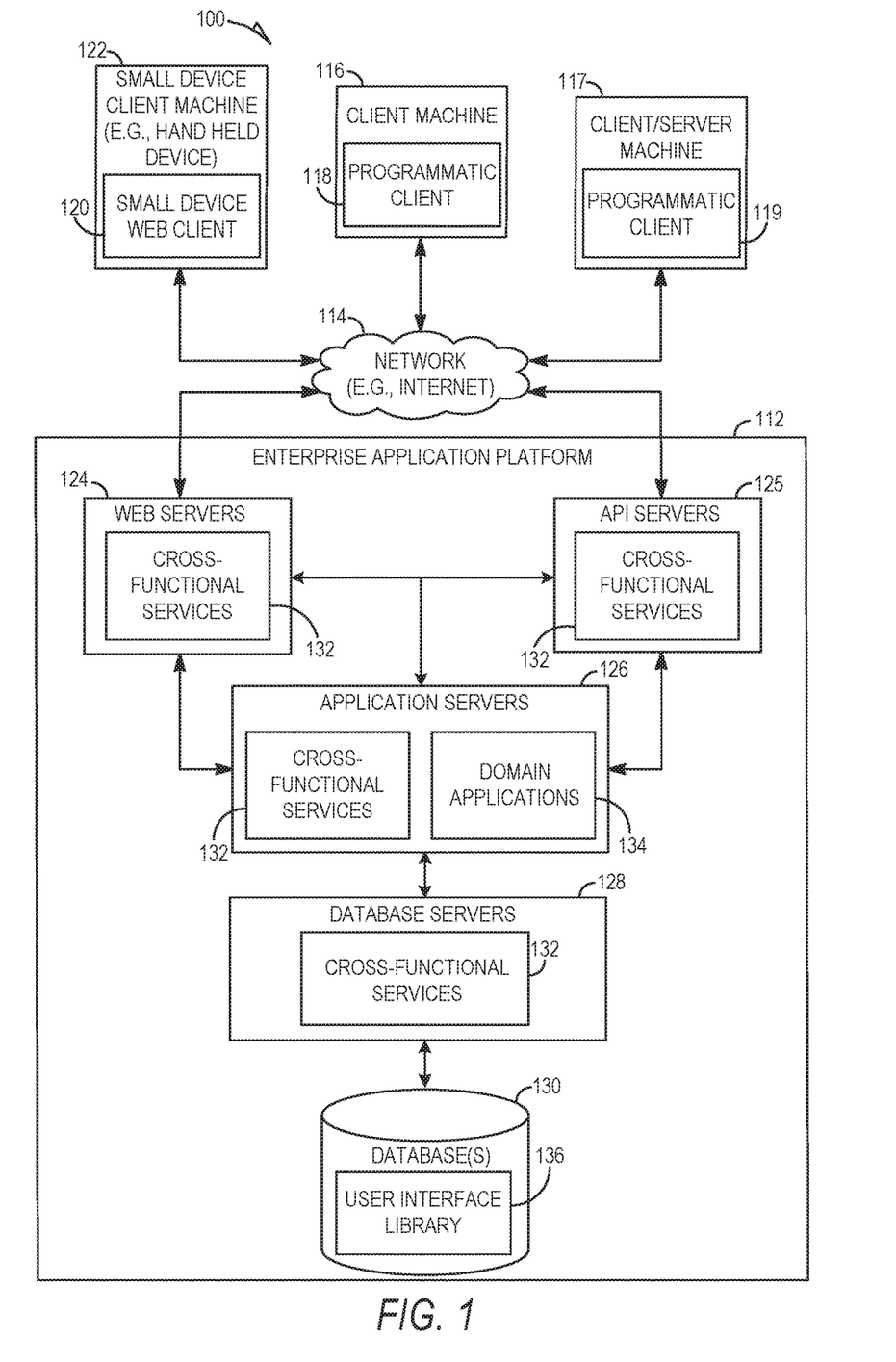
FIG. 1 is a network diagram illustrating a system, in accordance with some example embodiments.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
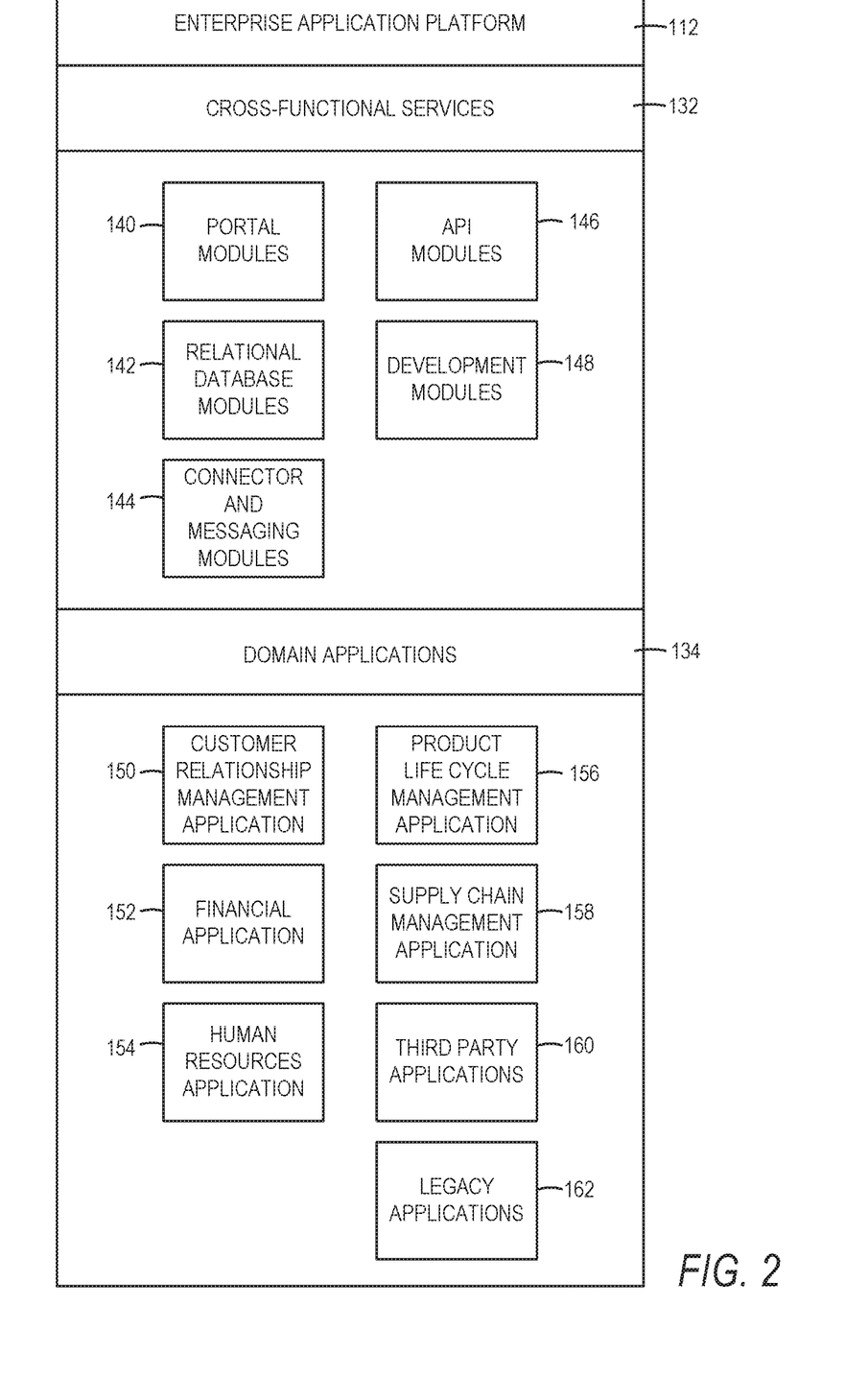
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
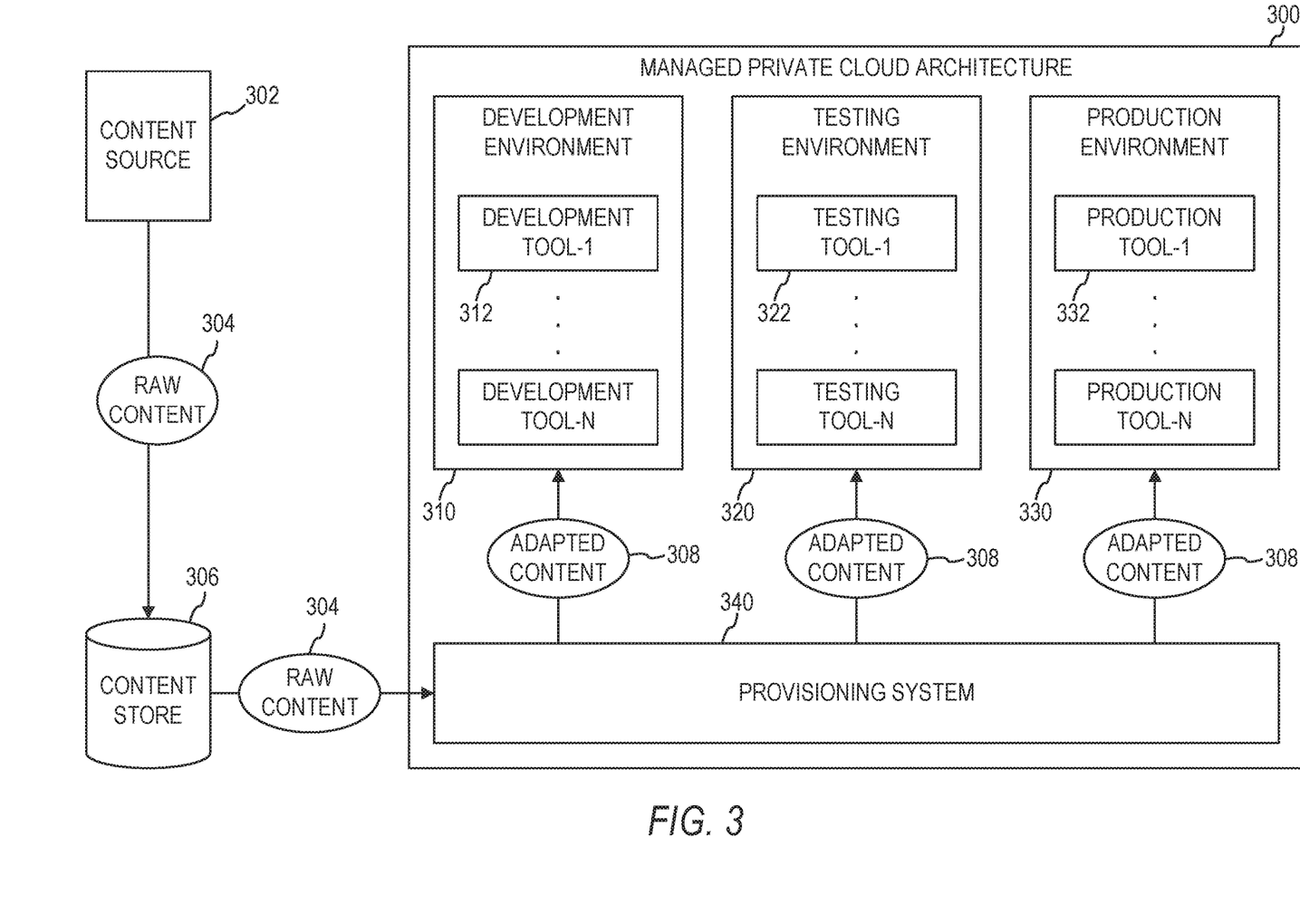
FIG. 3 is a block diagram illustrating a provisioning system of a managed private cloud architecture, in accordance with some example embodiments.

FIG. 3 is a block diagram illustrating a provisioning system 340 of a managed private cloud architecture 300, in accordance with some example embodiments. The managed private cloud architecture 300 may be incorporated into the enterprise application platform 112 of FIGS. 1 and 2. However, other configurations are also within the scope of the present disclosure. Managed private cloud refers to a principle in software architecture in which a single instance of software runs on a server or system of servers serving a single client organization tenant, which is in contrast to multitenancy, where multiple client organizations share a single server.

The managed private cloud architecture 300 may comprise a plurality of different environments. An environment or tier is a computer system in which a computer program or software component, such as a software tool, is deployed and executed. In some example embodiments, the managed private cloud architecture 300 comprises a development environment 310, a testing environment 320, and a production environment 330, which may be used to implement software development, testing, and deployment using a phased approach, such as Development, Testing, Acceptance, and Production (DTAP).

In a DTAP phased approach, a computer program or software component, such as a software solution, is developed in the development environment 310 using one or more software development tools 312 (e.g., DEVELOPMENT TOOL-1, . . . , DEVELOPMENT TOOL-N). Once the software developer thinks the software solution is ready, the software solution is copied to the testing environment 320, where testing is performed using one or more software testing tools (e.g., TESTING TOOL-1, . . . , TESING TOOL-N) to verify that it works as expected. This testing environment 320 may be configured to be in close alignment with the target environment. If the test is successful, then the software solution is copied to an acceptance test environment (not shown), in which the customer tests the software solution in this acceptance test environment to verify whether it meets their expectations. If the customer accepts the software solution, then the software solution is deployed to the production environment 330, where the software solution is made available to all users of the managed private cloud architecture 300 (e.g., members of the organization that is being served by the managed private cloud architecture 300) using one or more software production tools 332 (e.g., PRODUCTION TOOL-1, . . . , PRODUCTION TOOL-N).

In some example embodiments, the managed private cloud architecture 300 comprises a provisioning system 340 that is configured to obtain a raw library of content 304 from a content store 306 that is external to the managed private cloud architecture 300. The content store 306 may comprise an object store that manages data as objects, as opposed to other storage architectures like file systems which manages data as a file hierarchy, and block storage which manages data as blocks within sectors and tracks. However, other configurations of the content store 306 are also within the scope of the present disclosure.

In some example embodiments, the content store 306 receives a raw library of content 304 from a content source 302. The content source 302 may be a system that is external to the managed private cloud architecture 300 and configured to be used to author and release content. As new versions of content are created in the content source 302, these new versions may be transmitted to the content store 306, where they are stored. Each new version of content may be pushed from the content store 306 to the provisioning system 340.

In some example embodiments, the raw library of content 304 received by the provisioning system 340 includes best practices content, such as a standardized content library configured to support the implementation of ERP projects with ready to run content. The best practices content may include, but is not limited to, predefined processes, test scripts (e.g., a set of instructions that will be performed on the system under test to test that the system functions as expected), process flows in modeling notation (e.g., the Business Process Model and Notation), factsheets, and configuration guides. The provisioning system 340 may provide the received library of content, such as best practices content, to the different tools (e.g., software development tools 312, software testing tools 322, and software production tools 332) of the different environments (e.g., development environment 310, testing environment 320, and production environment 330) of the managed private cloud architecture 300 for use in their individual functions and operations.

In some example embodiments, the provisioning system 340 is configured to adapt the obtained raw library of content 304 to the managed private cloud architecture 300 using one or more rules of the organization being served by the managed private cloud architecture 300, generating an adapted library of content 308 by applying one or more constraints on use of the obtained raw library of content 304 within the managed private cloud architecture 300. The generating of the adapted library of content 308 may be performed automatically in response to the raw library of content 304 being pushed from the content store 308 to the provisioning system 340.

The provisioning system 340 may be configured to enable authorized users of the managed private cloud architecture 300 to author the rules of the organization, such as by manually entering the rules via a user interface. For example, a member of the organization having appropriate authorization may use a graphical user interface of the provisioning system 340 to submit a business requirement document that describes the rules. One of the software development tools 312 may enable a user to establish relationships between different software entities via a graphical user interface, and the rules may prevent certain relationships from being established between certain types of software entities, while allowing certain relationships to be established between other types of software entities. For example, the rules may dictate that a manufacturing plant is to be connected with a company code, but that the manufacturing plant is not to be connected with a shipping warehouse.

In some example embodiments, the provisioning system 340 generates the adapted library of content 308 by retrieving the rule(s) from a database (not shown) of the managed private cloud architecture 300, generating the constraint(s) based on the rule(s), and then generating the adapted library of content 308 based on the obtained raw library of content 304 and the constraint(s) 304. The generating of the constraint(s) may comprise generating configuration data that represents the constraint(s) and is configured to be used in implementing the constraint(s) when used by any of the software tools 312, 322, 332 of any of the environments 310, 320, 330. The configuration data may be combined with the obtained raw library of content 304 to form the adapted library of content 308, and the provisioning system 340 may then store the adapted library of content 308 in a repository (not shown) of the managed private cloud architecture 300.

In some example embodiments, the provisioning system 340 provides the adapted library of content 308 to the respective software tools 312, 322, 332 of the environments 310, 320, 330 of the managed private cloud architecture 300. The provisioning system 340 may push the adapted library of content 308 to the software tools 312, 322, 332, or may transmit the adapted library of content 308 to the software tools 312, 322, 332 in response to corresponding requests from the software tools 312, 322, 332.

Figure 4:
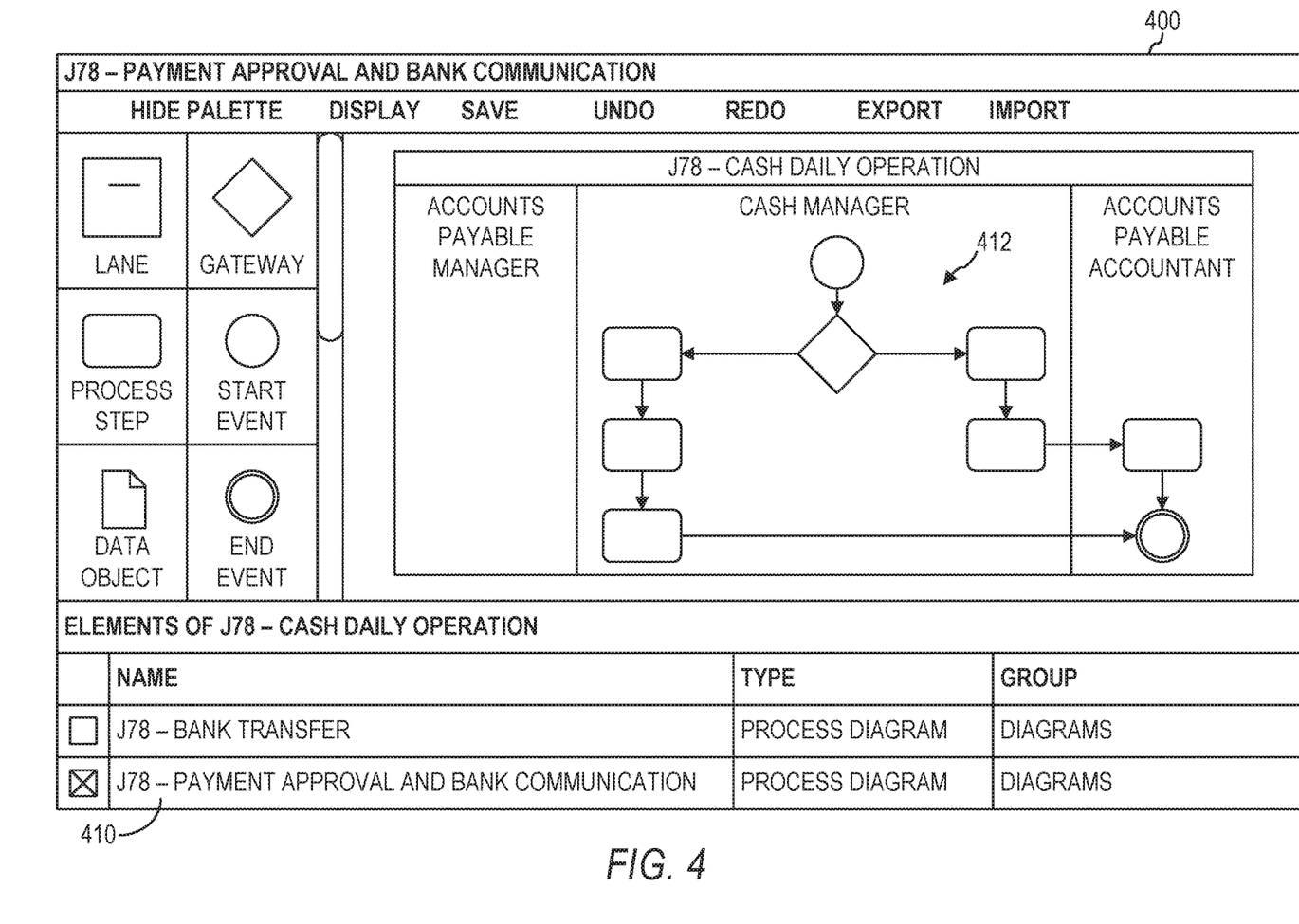
FIG. 4 illustrates a graphical user interface (GUI) in which an adapted library of content is used by a software tool within an environment of the managed private cloud architecture, in accordance with some example embodiments.

In some example embodiments, the development environment 310 comprises a plurality of software development tools 312 configured to develop an integrated software application using the adapted library of content 308. FIG. 4 illustrates a graphical user interface (GUI) 400 in which the adapted library of content 308 is used by one of the software development tools 312 within the development environment 310 of the managed private cloud architecture 300, in accordance with some example embodiments. In some example embodiments, the adapted library of content 308 is configured to be used by the software development tools 312 to generate a plurality of software entities, as well as relationships between the software entities. As shown in FIG. 4, the software development tool 312 displays corresponding selectable user interface elements 410 corresponding to best practices content included in the adapted library of content 308. User selection of one of the selectable user interface elements 410 may trigger the display of graphical user interface elements 412 representing the best practices content corresponding to the selected user interface element 410. In the example shown in FIG. 4, the user has selected a process diagram comprising software entities. The one or more constraints of the adapted library of content may comprise a restriction on a particular type of relationship being established between two or more of the software entities included in the process diagram.

In addition to being used by the software development tools 312 of the development environment 310, the adapted library of content 308 may also be used by the software testing tools 322 of the testing environment 320 to test an integrated software application. For example, the best practices content in the adapted library of content 308 may comprise test scripts that a user of the managed private cloud architecture 300 can edit for use in testing the integrated software application. Additionally, the constraints included in the adapted library of content 308 may restrict how the user can edit the test scripts. Furthermore, the adapted library of content 308 may also be used by the software production tools 332 of the production environment 330 to run a deployed version of the integrated software application.

The code of the integrated software application that is developed in the development environment 310, tested in the testing environment 320, and deployed in the production environment 330 may be transmitted directly from one environment to the other. For example, the code may be transmitted directly from the development environment 310 to the testing environment 320, and from the testing environment 320 to the production environment 330. The provisioning system 340 centralizes the delivery of the adapted library of content 308 by delivering the adapted library of content 308 directly to each of the environments 310, 320, 330, such as via an internal transport management service of the managed private cloud architecture 300. In this way, the software tools 312, 322, 332 of the environments 310, 320, 330 need not perform import activities and content adaptation processing. Rather, the adaptation processing and delivery of the content is managed centrally by the provisioning system 340.

Figure 5:
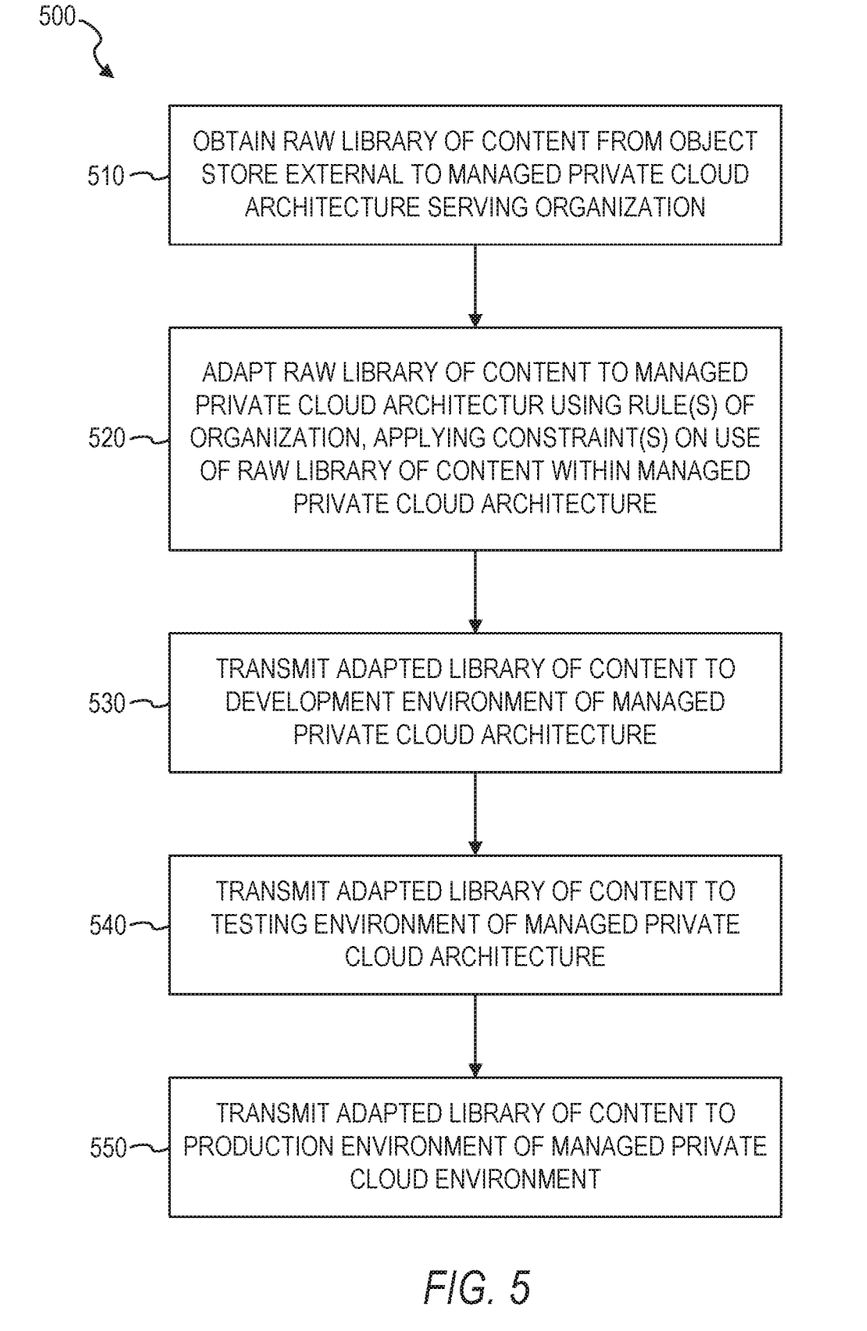
FIG. 5 is a flowchart illustrating a method of provisioning digital content efficiently and reliably across different tools of different environments of a private cloud architecture, in accordance with some example embodiments.

FIG. 5 is a flowchart illustrating a method 500 of provisioning digital content efficiently and reliably across different tools of different environments of a private cloud architecture, in accordance with some example embodiments. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the provisioning system 340 of FIG. 3.

At operation 510, the provisioning system 340 obtains a raw library of content from an object store. In some example embodiments, the object store is external to the managed private cloud architecture. The raw library of content may comprise one or more process flows in modelling notation, such as Business Process Model and Notation (BPMN). BPMN is a standard for business process modeling that provides a graphical notation for specifying business processes in a Business Process Diagram (BPD), based on a flowcharting technique very similar to activity diagrams from Unified Modeling Language (UML). Additionally or alternatively, the raw library of content may comprise one or more test scripts. A test script is a set of instructions that will be performed on the system under test to test that the system functions as expected. Other types of content may additionally or alternatively be included in the raw library of content, including, but not limited to, other types of best practices content.

The provisioning system 340 may adapt the obtained raw library of content to the managed private cloud architecture using one or more rules of the organization, at operation 520. In some example embodiments, the adapting of the obtained raw library of content comprises generating an adapted library of content by applying one or more constraints on use of the obtained raw library of content within the managed private cloud architecture (e.g., the architecture 300). The generating of the adapted library of content may be performed automatically in response to the raw library of content being pushed from the object store to the computer system of the managed private cloud architecture.

At operation 530, the provisioning system 340 transmits the adapted library of content to a development environment of the managed private cloud architecture. In some example embodiments, the development environment comprises a plurality of software development tools configured to develop an integrated software application using the adapted library of content. The adapted library of content may be configured to be used by the plurality of software development tools to generate a plurality of software entities. In some example embodiments, the one or more constraints comprise a restriction on a particular type of relationship being established between two or more of the plurality of software entities.

The provisioning system 340 may also transmit the adapted library of content to a testing environment of the managed private cloud architecture, at operation 540. In some example embodiments, the testing environment comprises a plurality of software testing tools configured to test the integrated software application using the adapted library of content.

Furthermore, at operation 550, the provisioning system 340 may also transmit the adapted library of content to a production environment of the managed private cloud architecture. In some example embodiments, the production environment is configured to run a deployed version of the integrated software application using the adapted library of content.

It is contemplated that any of the other features described within the present disclosure can be incorporated into the method 500.

Figure 6:
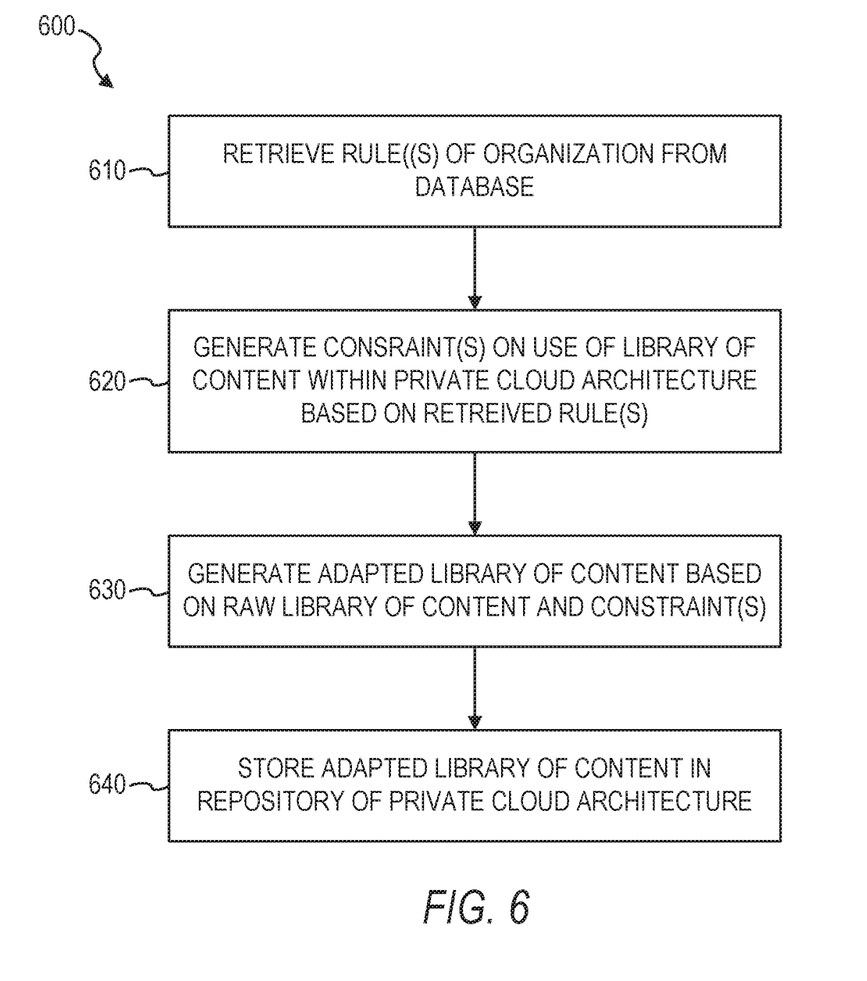
FIG. 6 is a flowchart illustrating a method of generating an adapted library of content, in accordance with some example embodiments.

FIG. 6 is a flowchart illustrating a method 600 of generating an adapted library of content, in accordance with some example embodiments. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by the provisioning system 340 of FIG. 3.

At operation 610, the provisioning system 340 retrieves the one or more rules from a database. Then, the provisioning system 340 generates the one or more constraints based on the one or more rules, at operation 620. Next, at operation 630, the provisioning system 340 generates the adapted library of content based on the obtained raw library of content and the one or more constraints. The provisioning system 340 may then store the adapted library of content in a repository of the managed private cloud architecture, at operation 640. It is contemplated that any of the other features described within the present disclosure can be incorporated into the method 600.

The following paragraphs provide example embodiments.

Example 1 includes a computer-implemented method performed by a computer system of a managed private cloud architecture serving an organization, the computer system having a memory and at least one hardware processor, the computer-implemented method comprising: obtaining a raw library of content from an object store, the object store being external to the managed private cloud architecture; adapting the obtained raw library of content to the managed private cloud architecture using one or more rules of the organization, the adapting of the obtained raw library of content generating an adapted library of content by applying one or more constraints on use of the obtained raw library of content within the managed private cloud architecture; transmitting the adapted library of content to a development environment of the managed private cloud architecture, the development environment comprising a plurality of software development tools configured to develop an integrated software application using the adapted library of content; transmitting the adapted library of content to a testing environment of the managed private cloud architecture, the testing environment comprising a plurality of software testing tools configured to test the integrated software application using the adapted library of content; and transmitting the adapted library of content to a production environment of the managed private cloud architecture, the production environment being configured to run a deployed version of the integrated software application using the adapted library of content.

Example 2 includes the computer-implemented method of example 1, wherein the raw library of content comprises one or more process flows in modelling notation.

Example 3 includes the computer-implemented method of example 1 or example 2, wherein the raw library of content comprises one or more test scripts.

Example 4 includes the computer-implemented method of any one of examples 1 to 3, wherein the generating of the adapted library of content is performed automatically in response to the raw library of content being pushed from the object store to the computer system of the managed private cloud architecture.

Example 5 includes the computer-implemented method of any one of examples 1 to 4, wherein the generating of the adapted library of content comprises: retrieving the one or more rules from a database; generating the one or more constraints based on the one or more rules; generating the adapted library of content based on the obtained raw library of content and the one or more constraints; and storing the adapted library of content in a repository of the managed private cloud architecture.

Example 6 includes the computer-implemented method of any one of examples 1 to 5, wherein the adapted library of content is configured to be used by the plurality of software development tools to generate a plurality of software entities.

Example 7 includes the computer-implemented method of any one of examples 1 to 6, wherein the one or more constraints comprises a restriction on a particular type of relationship being established between two or more of the plurality of software entities.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
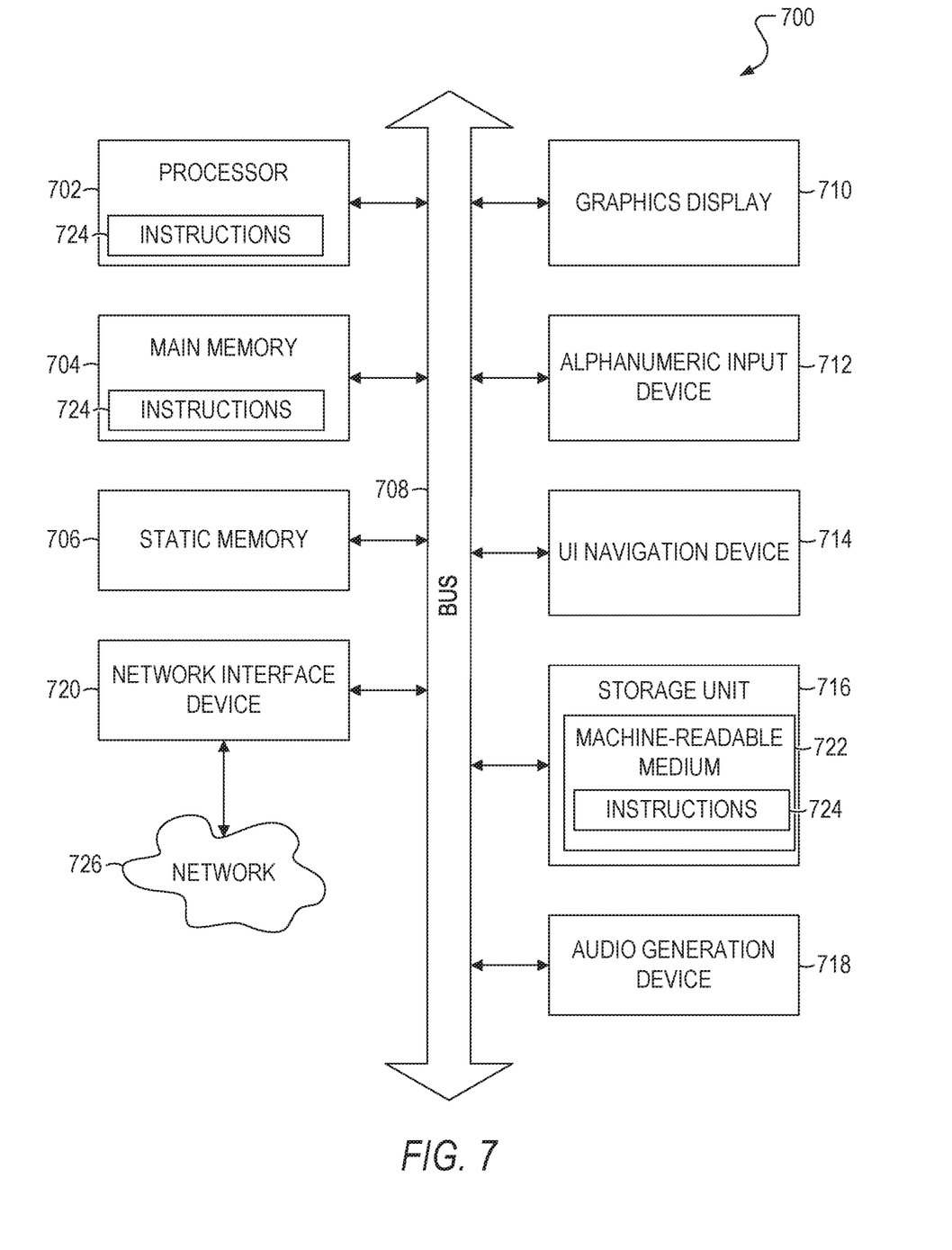
FIG. 7 is a block diagram of an example computer system on which methodologies described herein can be executed, in accordance with some example embodiments.

FIG. 7 is a block diagram of a machine in the example form of a computer system 700 within which instructions 724 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system of a managed private cloud architecture serving an organization, the computer system having a memory and at least one hardware processor, the computer-implemented method comprising:

obtaining a raw library of content from an object store, the object store being external to the managed private cloud architecture;

adapting the obtained raw library of content to the managed private cloud architecture using one or more rules of the organization, the adapting of the obtained raw library of content generating an adapted library of content by applying one or more constraints on use of the obtained raw library of content within the managed private cloud architecture;

transmitting the adapted library of content to a development environment of the managed private cloud architecture, the development environment comprising a plurality of software development tools configured to develop an integrated software application using the adapted library of content;

transmitting the adapted library of content to a testing environment of the managed private cloud architecture, the testing environment comprising a plurality of software testing tools configured to test the integrated software application using the adapted library of content; and transmitting the adapted library of content to a production environment of the managed private cloud architecture, the production environment being configured to run a deployed version of the integrated software application using the adapted library of content.

2. The computer-implemented method of claim 1, wherein the raw library of content comprises one or more process flows in modelling notation.

3. The computer-implemented method of claim 1, wherein the raw library of content comprises one or more test scripts.

4. The computer-implemented method of claim 1, wherein the generating of the adapted library of content is performed automatically in response to the raw library of content being pushed from the object store to the computer system of the managed private cloud architecture.

5. The computer-implemented method of claim 1, wherein the generating of the adapted library of content comprises:

retrieving the one or more rules from a database;

generating the one or more constraints based on the one or more rules;

generating the adapted library of content based on the obtained raw library of content and the one or more constraints; and storing the adapted library of content in a repository of the managed private cloud architecture.

6. The computer-implemented method of claim 1, wherein the adapted library of content is configured to be used by the plurality of software development tools to generate a plurality of software entities.

7. The computer-implemented method of claim 6, wherein the one or more constraints comprises a restriction on a particular type of relationship being established between two or more of the plurality of software entities.

8. A system of comprising:

at least one hardware processor of a managed private cloud architecture serving an organization; and a non-transitory computer-readable medium of the managed private cloud architecture, the non-transitory computer-readable medium storing executable instructions that, when executed, cause the at least one processor to perform operations comprising:

obtaining a raw library of content from an object store, the object store being external to the managed private cloud architecture;
adapting the obtained raw library of content to the managed private cloud architecture using one or more rules of the organization, the adapting of the obtained raw library of content generating an adapted library of content by applying one or more constraints on use of the obtained raw library of content within the managed private cloud architecture;
transmitting the adapted library of content to a development environment of the managed private cloud architecture, the development environment comprising a plurality of software development tools configured to develop an integrated software application using the adapted library of content;
transmitting the adapted library of content to a testing environment of the managed private cloud architecture, the testing environment comprising a plurality of software testing tools configured to test the integrated software application using the adapted library of content; and
transmitting the adapted library of content to a production environment of the managed private cloud architecture, the production environment being configured to run a deployed version of the integrated software application using the adapted library of content.

9. The system of claim 8, wherein the raw library of content comprises one or more process flows in modelling notation.

10. The system of claim 8, wherein the raw library of content comprises one or more test scripts.

11. The system of claim 8, wherein the generating of the adapted library of content is performed automatically in response to the raw library of content being pushed from the object store to a computer system of the managed private cloud architecture.

12. The system of claim 8, wherein the generating of the adapted library of content comprises:
retrieving the one or more rules from a database;
generating the one or more constraints based on the one or more rules;
generating the adapted library of content based on the obtained raw library of content and the one or more constraints; and
storing the adapted library of content in a repository of the managed private cloud architecture.

13. The system of claim 8, wherein the adapted library of content is configured to be used by the plurality of software development tools to generate a plurality of software entities.

14. The system of claim 13, wherein the one or more constraints comprises a restriction on a particular type of relationship being established between two or more of the plurality of software entities.

15. A non-transitory machine-readable storage medium of a managed private cloud architecture serving an organization, the non-transitory machine-readable storage medium tangibly embodying a set of instructions that, when executed by at least one hardware processor, causes the at least one processor to perform operations comprising:
obtaining a raw library of content from an object store, the object store being external to the managed private cloud architecture;
adapting the obtained raw library of content to the managed private cloud architecture using one or more rules of the organization, the adapting of the obtained raw library of content generating an adapted library of content by applying one or more constraints on use of the obtained raw library of content within the managed private cloud architecture;
transmitting the adapted library of content to a development environment of the managed private cloud architecture, the development environment comprising a plurality of software development tools configured to develop an integrated software application using the adapted library of content;
transmitting the adapted library of content to a testing environment of the managed private cloud architecture, the testing environment comprising a plurality of software testing tools configured to test the integrated software application using the adapted library of content; and
transmitting the adapted library of content to a production environment of the managed private cloud architecture, the production environment being configured to run a deployed version of the integrated software application using the adapted library of content.

16. The non-transitory machine-readable storage medium of claim 15, wherein the raw library of content comprises one or more process flows in modelling notation.

17. The non-transitory machine-readable storage medium of claim 15, wherein the raw library of content comprises one or more test scripts.

18. The non-transitory machine-readable storage medium of claim 15, wherein the generating of the adapted library of content is performed automatically in response to the raw library of content being pushed from the object store to a computer system of the managed private cloud architecture.

19. The non-transitory machine-readable storage medium of claim 15, wherein the generating of the adapted library of content comprises:
retrieving the one or more rules from a database;
generating the one or more constraints based on the one or more rules;
generating the adapted library of content based on the obtained raw library of content and the one or more constraints; and
storing the adapted library of content in a repository of the managed private cloud architecture.

20. The non-transitory machine-readable storage medium of claim 15, wherein the adapted library of content is configured to be used by the plurality of software development tools to generate a plurality of software entities.

* * * * *